United States Patent
Le Razavet

(10) Patent No.: US 10,305,938 B2
(45) Date of Patent: May 28, 2019

(54) CALL SERVER FOR OPTIMIZING GATEWAY RESOURCES

(71) Applicant: Alcatel Lucent, Boulogne-Billancourt (FR)

(72) Inventor: Olivier Le Razavet, Lannion (FR)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 15/128,256

(22) PCT Filed: Jan. 28, 2015

(86) PCT No.: PCT/EP2015/051727
§ 371 (c)(1),
(2) Date: Sep. 22, 2016

(87) PCT Pub. No.: WO2015/144336
PCT Pub. Date: Oct. 1, 2015

(65) Prior Publication Data
US 2017/0111401 A1    Apr. 20, 2017

(30) Foreign Application Priority Data
Mar. 26, 2014 (EP) .................................... 14305427

(51) Int. Cl.
*H04L 29/06* (2006.01)
*G06F 15/16* (2006.01)

(52) U.S. Cl.
CPC ........ *H04L 65/1046* (2013.01); *H04L 65/103* (2013.01); *H04L 65/1006* (2013.01); *H04L 65/1069* (2013.01)

(58) Field of Classification Search
USPC .......................................................... 709/227
See application file for complete search history.

(56) References Cited

U.S. PATENT DOCUMENTS

| | | | | |
|---|---|---|---|---|
| 6,009,331 A | * | 12/1999 | Ueda ..................... | H04W 28/16 455/450 |
| 6,901,074 B1 | * | 5/2005 | Yamasaki ............... | H04L 12/28 370/392 |
| 7,991,144 B2 | * | 8/2011 | Takahashi ......... | H04M 3/42187 379/258 |

(Continued)

OTHER PUBLICATIONS

Schulzrinne et al., Communications Resource Priority for the Session Initiation Protocol (SIP): RFC 4412, Feb. 2006, IEEE, pp. 1-36.*

(Continued)

*Primary Examiner* — Alicia Baturay
(74) *Attorney, Agent, or Firm* — Harness, Dickey & Pierce, P.L.C.

(57) ABSTRACT

A call server for optimizing the use of the resources in a media gateway of a core network, this call server being configured to receive a session setup request message decide to accept or to reject the session setup request as a function of the load of a gateway controlled by this call server retrieve an internal priority value assigned to an incoming SIP trunk linked to this core network and carrying this session setup request message and decide to accept or to reject the session setup request also as a function of the internal priority value assigned to an incoming SIP trunk carrying this session setup request message.

5 Claims, 10 Drawing Sheets

(56) References Cited

U.S. PATENT DOCUMENTS

| | | | | |
|---|---|---|---|---|
| 8,144,693 | B1* | 3/2012 | Robbins | H04L 65/1076 370/352 |
| 8,223,746 | B2* | 7/2012 | Franz | H04M 3/493 370/352 |
| 8,274,983 | B2* | 9/2012 | Lange | H04L 45/22 370/395.21 |
| 8,417,279 | B2* | 4/2013 | Yang | H04W 52/58 455/450 |
| 8,570,870 | B2* | 10/2013 | Das | H04L 47/72 370/235 |
| 8,832,307 | B2* | 9/2014 | Furutono | H04M 3/367 379/249 |
| 8,861,705 | B1* | 10/2014 | Asghari | H04M 3/42187 379/208.01 |
| 9,088,486 | B2* | 7/2015 | Moynihan | H04L 41/0659 |
| 9,319,530 | B2* | 4/2016 | Robbins | H04L 65/1076 |
| 9,654,440 | B1* | 5/2017 | Nehme Antoun | H04L 61/1511 |
| 9,825,879 | B2* | 11/2017 | Arvidson | H04L 47/805 |
| 10,021,250 | B1* | 7/2018 | Chen | H04W 76/50 |
| 2006/0002382 | A1* | 1/2006 | Cohn | H04L 12/5601 370/356 |
| 2008/0089324 | A1* | 4/2008 | Polk | H04L 65/608 370/389 |
| 2009/0031016 | A1* | 1/2009 | Nakai | H04L 69/40 709/223 |
| 2010/0034195 | A1 | 2/2010 | Das et al. | |
| 2010/0034196 | A1 | 2/2010 | Das et al. | |
| 2010/0034197 | A1 | 2/2010 | Das et al. | |
| 2010/0034367 | A1 | 2/2010 | Das et al. | |

OTHER PUBLICATIONS

International Search Report PCT/ISA/210 for International Application No. PCT/EP2015/051727 dated Mar. 18, 2015.

Written Opinion of the International Searching Authority PCT/ISA/237 for International Application No. PCT/EP2015/051727 dated Mar. 18, 2015.

Schulzrinne Columbia U J Polk Cisco Systems, "Communications Resource Priority for the Session Initiation Protocol (SIP)", Feb. 1, 2006, ISSN: 000-0003.

International Telecommunications Union, "Gateway control protocol: Guidelines on the use of the international emergency preference scheme (IEPS) call indicator and priority indicator in ITU-T H.248 profiles", (2011), Amendment 1: Mar. 16, 2013, ITU-T Standard.

* cited by examiner

CALL SERVER FOR OPTIMIZING GATEWAY RESOURCES

CROSS-REFERENCE TO RELATED APPLICATIONS

This application is the U.S. National Phase application of PCT Application No. PCT/EP2015/051727 filed on Jan. 28, 2015, which claims priority to European Patent Application No. 14305427.8 filed on Mar. 26, 2014, the entire contents of each of which are incorporated herein by reference.

BACKGROUND OF THE INVENTION

Field of the Invention

The present invention generally relates to an enhanced call server for the optimization of the gateway resources in a telecommunication network based on the IMS (Internet protocol Multimedia Subsystem) architecture.

IMS is based on Internet standards which are currently the major way to deliver services on new networks. It uses the Session Initiation Protocol (SIP) for establishing, managing and terminating sessions. The overall IMS architecture uses a number of components to enable multimedia based sessions between two or more end devices.

A core IMS network is used for interconnecting various types of telecommunication networks. A gateway is placed at the border of a core IMS network for linking it to a peripheral network that may be not based on the IMS architecture. A gateway can receive incoming traffic, i. e. traffic from a peripheral network to the core network, this incoming traffic being in transit or terminating in this gateway. A gateway can also send outgoing traffic i. e. traffic from the core network to a peripheral network, this outgoing traffic being in transit in the core gateway.

This traffic is triggered by different sessions coming from various peripheral networks. These sessions have classically various priority levels. In particular emergency calls have a high priority. Low priority calls may be rejected by a call server if a gateway is congested.

It is difficult, for a network operator, to estimate the outgoing traffic and the terminating traffic to be supported by the gateways of an IMS core network, because these traffics are varying with time.

Description of the Prior Art

Classically, an operator dimensions the resources of each gateway by taking into account the maximal expected traffic outgoing via this gateway, this outgoing traffic being the sum of several traffics originating from all the peripheral networks generating traffic towards this gateway. The resources respectively assigned for the traffics from the peripheral networks are then static. Each peripheral network supplies a part of the load to be supported, and each of them has the same weight and priority when sessions, coming from those networks, are set up. Unfortunately, the traffic load supplied by a given peripheral network varies with time. So each peripheral supplies its maximal traffic load at a time that is respectively different for the different peripheral networks.

In order to be sure to provide the number of sessions requested by customers, and fulfil the relevant service level agreements, the operator could consider the maximal outgoing traffic load of each peripheral network. In each media gateway, it should provide resources sufficient for an outgoing traffic corresponding to the sum of the maximal outgoing traffic loads. However each peripheral network supplies a maximal traffic load at a different busy hour.

Similarly, in each media gateway, it should provide resources sufficient for an incoming traffic corresponding to the sum of the maximal incoming traffic loads. However each peripheral network supplies a maximal incoming traffic load at a different busy hour.

So the real traffic is lower than the available resources at any time. This known method leads to over-dimensioning each gateway: The gateway resources are not optimized, and the investment to support the total traffic is costly for the operator.

A known solution consists in providing resources lower than the sum of the maximal traffic loads, and dropping data packets if ever an incoming media gateway or an outgoing media gateway is overloaded. However this solution is unfair: Consider a peripheral network N1 that supplies its maximal traffic load at the time H1 everyday and a peripheral network N2 that supplies its maximal traffic load at the time H2 every day. At the time H2, for instance, a session belonging to the network N2 may be dropped because a media gateway is overloaded, whereas a session belonging to the network 1 may be accepted in spite of the fact the network N2 should have more priority since it has more many traffic to supply at its busy hour H2.

The document US 201/034195 describes a call server for optimizing the use of the resources in a media gateway of a core network, this call server being configured to:
receive a session setup request message;
and decide to accept or to reject the session setup request as a function of the load of a gateway controlled by this call server.

It is configured to retrieve a priority indicator that is related to the specific user initiating the request.

Thus, there is a need to provide a better technical solution for optimizing the gateway resources in a telecommunication network.

This can be solved by applying, the call server according to the invention.

SUMMARY OF THE INVENTION

The object of the invention is a call server for optimizing the use of the resources in a media gateway of a core network, this call server being configured to:
receive a session setup request message;
decide to accept or to reject the session setup request as a function of the load of a gateway controlled by this call server;
retrieve an internal priority value;
and decide to accept or to reject the session setup request also as a function of the internal priority value;
and being characterized in that said internal priority value has been assigned to an incoming SIP trunk linked to this core network and carrying this session setup request message.

Thanks to the internal priority assigned to a trunk, it is possible to limit the resources reserved in an incoming media gateway or an outgoing media gateway linked to this trunk, i. e. for a given peripheral network. This internal priority can be assigned by an operator as a function of the respective busy hours or service level agreements of the various peripheral networks interworking with the core network. If a gateway is overloaded, only a high priority peripheral network is allowed to establish new sessions. For low priority peripheral networks, session setup requests are rejected. At each busy hour of a given network, a call server will be able to support 100% of the load generated by a favored peripheral network, while other networks will be only able to generate a low traffic load. So depending on the time of the day, each peripheral network linked to the core network will get high priority and then low priority in turn.

Other features and advantages of the present invention will become more apparent from the following detailed description of embodiments of the present invention, when taken in conjunction with the accompanying drawings.

BRIEF DESCRIPTION OF THE DRAWINGS

In order to illustrate in detail features and advantages of embodiments of the present invention, the following description will be with reference to the accompanying drawings. If possible, like or similar reference numerals designate the same or similar components throughout the figures thereof and description, in which.

DETAILED DESCRIPTION OF THE PREFERRED EMBODIMENTS

Figure 1:
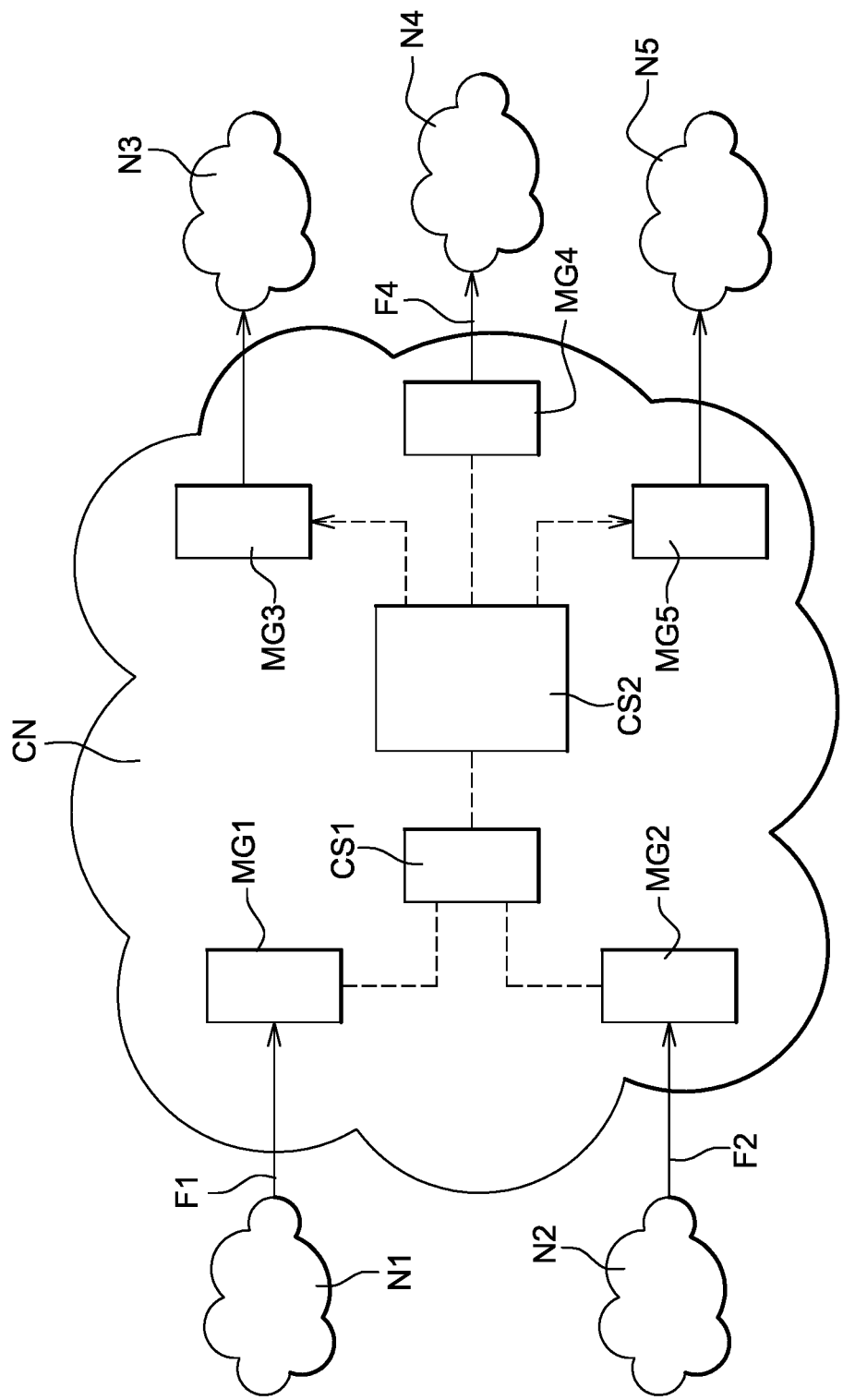
FIG. 1 represents an exemplary core network based on the IMS architecture.

FIG. 1 represents an exemplary core network CN based on the IMS architecture. It is linked to five peripheral networks N1, . . . , N5 that can be of different types, for instance network based on the Internet protocol and legacy time division multiplex networks.

The core network CN comprises:
Two call servers CS1 and CS2 that can be media gateway control functions (MGCF) or interconnection border control functions (IBCF) or session border controllers (SBC).
Five media gateways MG1, . . . , MG5 that are respectively interfaces with the peripheral networks N1, . . . , N5. The media gateways MG1 and MG2 are controlled by the call server CS1. The media gateways MG3, MG4, and MG5 are controlled by the call server CS2.

In the following descriptions, we will consider:
a first incoming data flow F1 originating from the peripheral network N1,
a second incoming data flow F2 originating from the peripheral network N2,
and an outgoing data flow F4 destined to the peripheral network N4.

In this simple example, the outgoing data flow F4 is composed of the addition of the data flows F1 and F2 if there is no congestion, in the media gateway MG5, preventing to output a traffic load corresponding to the sum of the traffic loads of the two data flows F1 and F2.

Each media gateway informs the call server that controls it of its load. Thanks to this information, the call server decides to accept or reject new sessions.

The incoming call server CS1 manages the incoming flow F1, originating from the peripheral network N1 via the incoming media gateway MGW1, and the incoming flow F2, originating from the peripheral network N2 via the incoming media gateway MGW2: For each call, it selects an outgoing media gateway depending on the destination dial number or the destination address of this call. In this example, the two flows F1 and F2 are routed to the outgoing media gateway MGW4 linked to the peripheral network N4. The sum of these two flows constitutes a flow F4 at the output of the outgoing media gateway MGW4

The call server CS1 reserves resources on the media gateway MGW1 for bearer transport as long as the media gateway MGW1 is not overloaded, i. e. as long as the traffic load does not exceed a predetermined threshold fixed for the gateway MGW1.

For each call, the outgoing call server CS2 controls the outgoing media gateway MGW4 in order to set up a session, depending on the dial number/destination address of the call. It takes resources on the media gateway MGW4 as long as the outgoing media gateway MGW4 is not overloaded.

Figure 2:
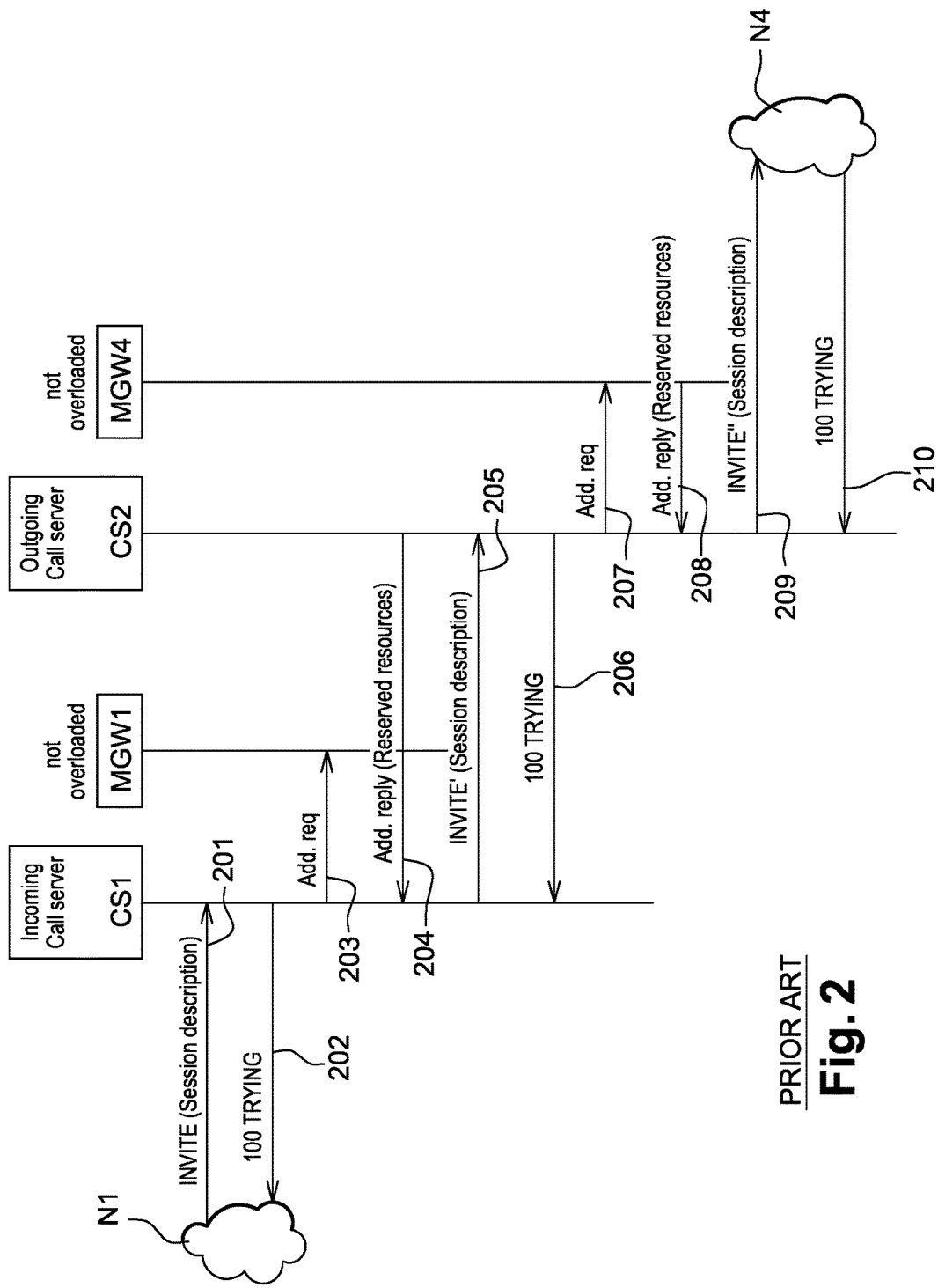
FIGS. 2, 3A, 3B illustrate the session setup in call servers according to the prior art, in this exemplary core network.

FIG. 2 illustrates the session setup in this exemplary core network CN, with call servers according to the prior art, when the incoming media gateway MGW1 and outgoing gateway GW4 are not overloaded.

Step 201: The incoming call server CS1 receives a SIP message INVITE comprising a session description (according to the session description protocol SDP), and requesting the setup of a session for a call originating from the peripheral network N1. The call server CS1 retrieves the characteristics (e.g. type of signaling, trusted/untrusted network, type of SIP adaptation (SIP screening table) . . . ) of the incoming SIP trunk that carries the signaling for the session to be set up Step 202: The incoming call server CS1 acknowledges reception by sending a SIP message 100 TRYING to the network N1.

Step 203: Then the call server CS1 applies routing and SIP trunk selection, and reserves RTP resources (a RTP termination) at the selected media gateway MGW1 by sending an H.248 message "Add.req" to the media gateway MGW1, for the session to be set up.

Step 204: The media gateway MGW1 responds to the call server CS1 by sending an H.248 message "Add.reply" containing a session descriptor (according to SDP) comprising the characteristics of the real time transport protocol resources (RTP resources) selected for the session.

Step 205: The call server CS1 sends, to the outgoing server CS2, a SIP message INVITE' including a session description (according SDP) and describing, in particular, the RTP termination selected for the session, at the media gateway MGW1.

Step 206: The call server CS2 acknowledges reception to the call server CS1 by sending a SIP message 100 TRYING.

Step 207: Upon the reception of the message INVITE' sent by the call server CS1, the call server CS2 performs routing, selects the outgoing media gateway MGW4, and reserve a RTP termination in the media gateway MGW4, for the session, by sending an H.248 message "Add.req" to the media gateway MGW4.

Step 208: The media gateway MGW4 responds to the call server CS2 by sending an H.248 message "Add.reply" containing a session descriptor comprising the characteristics of the RTP termination selected for the session.

Step 209: The call server CS2 sends, to a remote node in the peripheral network N4, a SIP message INVITE" including a session description (according to SDP) describing, in particular, the RTP termination selected at the incoming media gateway MGW4, in order to set up the session with the RTP termination reserved at the outgoing media gateway MGW4.

Step 210: The remote node, in the peripheral network N4, acknowledges reception, to the call server CS2, by sending a SIP message 100 TRYING.

Figure 3A:
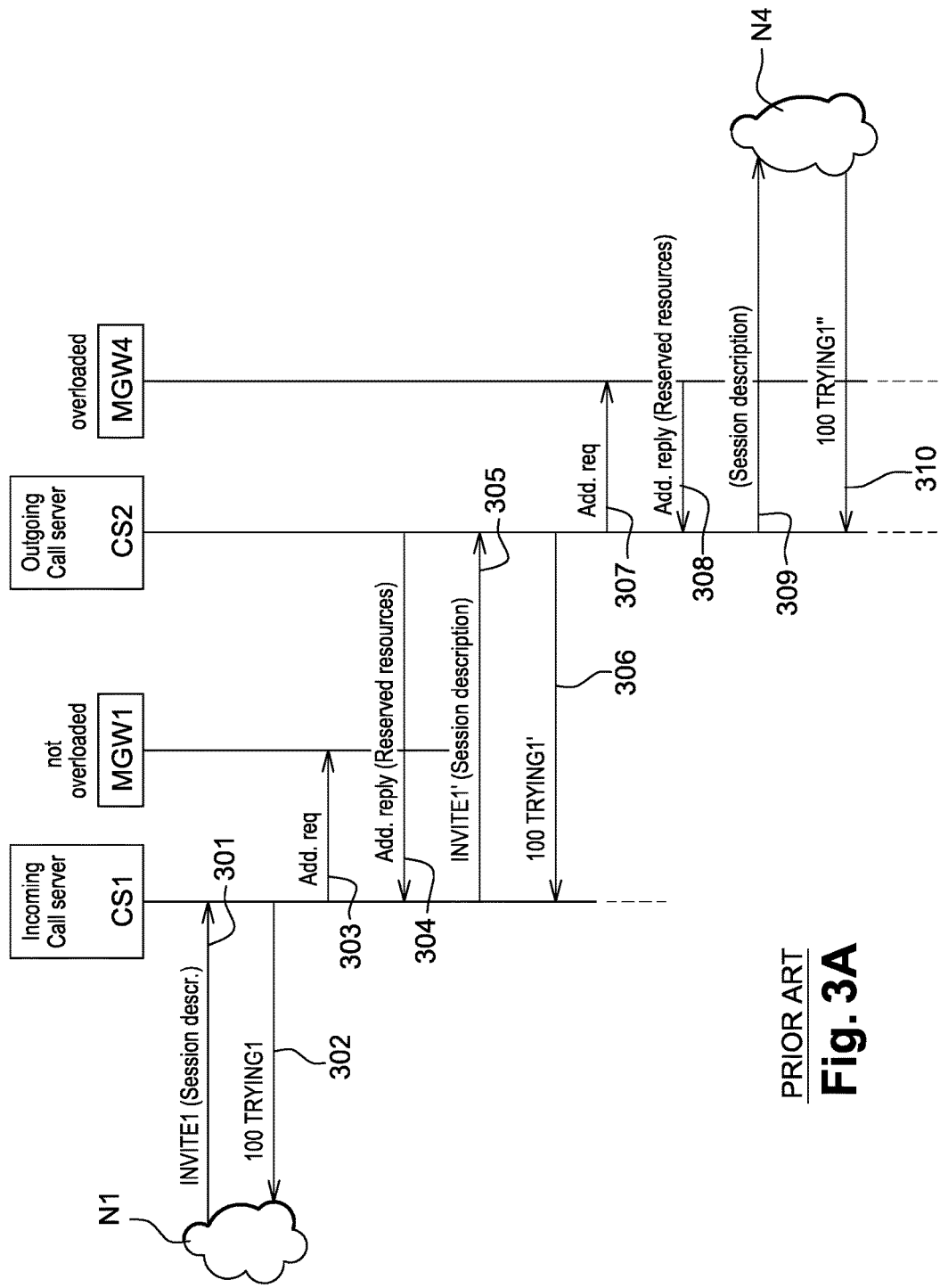
Figure 3B:
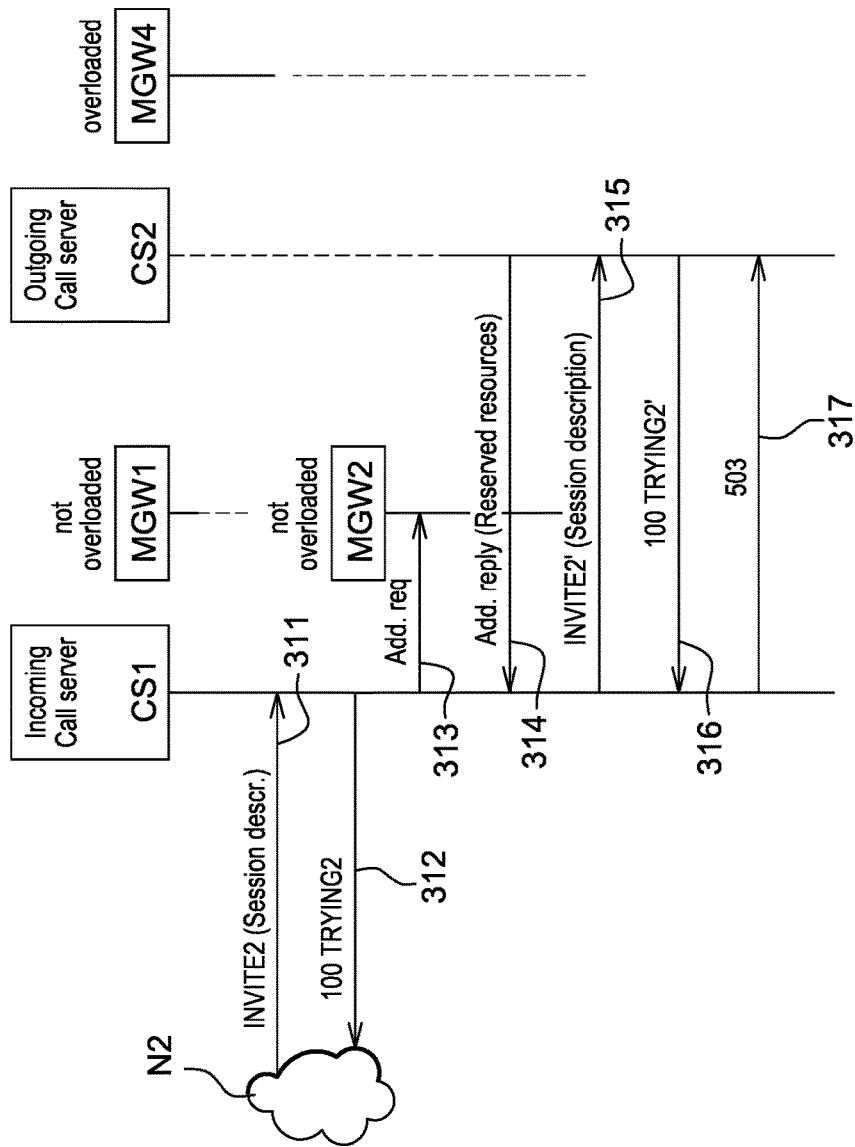

FIG. 3A and FIG. 3B illustrate the session setup in this exemplary core network CN, with call servers according to the prior art, when the incoming gateway MGW1 is not overloaded and the outgoing gateway MGW4 is overloaded.

The media gateway MGW4 informs the call server CS2 that it is overloaded. Thanks to this information, the call server CS2 will decide to accept or reject new session setup requests.

Step 301: The incoming call server CS1 receives a SIP message INVITE1 comprising a session description (according to SDP), and requesting the setup of a first session, this request originating from the peripheral network N1.

Step 302: The incoming call server CS1 acknowledges reception with a SIP message 100 TRYING1 addressed to the network N1.

Step 303: Then the call server CS1 applies routing and SIP trunk selection, and reserves RTP resources (a RTP termination) at the selected media gateway MGW1 by sending an H.248 message "Add.req" to the media gateway MGW1.

Step 304: The media gateway MGW1 responds to the call server CS1 by sending an H.248 message "Add.reply" containing a session descriptor (according to SDP) comprising the characteristics of the real time transport protocol resources (RTP resources) selected in the media gateway MGW1 for the session.

Step 305: The call server CS1 sends, to the outgoing server CS2, a SIP message INVITE1' including a session description describing in particular the RTP termination selected for the session, at the media gateway MGW1.

Step 306: The call server CS2 responds to the call server CS1 by sending a SIP message 100 TRYING1'.

Step 307 Upon the reception of the message INVITE sent by the call server CS1, the call server CS2 performs routing, selects the outgoing media gateway MGW4, and reserve a RTP termination in the media gateway MGW4 by sending an H.248 message "Add.req" to the media gateway MGW4.

Step 308: The media gateway MGW4 responds to the call server CS2 by sending an H.248 message "Add.reply" containing a session descriptor (according to SDP) comprising the characteristics of the RTP resource selected for the session.

Step 309: The call server CS2 sends a SIP message INVITE1" to a remote node in the peripheral network N4, this message indicating the reserved resources at the media gateway MGW4.

Step 310: The remote node acknowledges reception, to the call server CS2, by a SIP message 100 TRYING1".

Step 311: The incoming call server CS1 receives a SIP message INVITE2 comprising a session description (according to SDP), and, requesting the setup of a second call, originating from the peripheral network N2.

Step 312: The incoming call server CS1 acknowledges reception with a SIP message 100 TRYING1 addressed to the network N2.

Step 313: Then the call server CS1 applies routing and SIP trunk selection, and reserves resources (RTP termination) at media gateway MGW2 by sending an H.248 message "Add.reply" containing a session descriptor (according to SDP) comprising the characteristics of the RTP resources selected for the session.

Step 314: The media gateway MGW2 responds to the call server CS1 by sending an H.248 message "Add.reply" containing a session descriptor (according to SDP) comprising the characteristics of the RTP resources selected at media gateway MGW2 for the second session request.

Step 315: The call server CS1 sends, to the outgoing call server CS2, an SIP message INVITE2' including a session description (according to SDP) describing in particular the RTP termination selected at the media gateway MGW2 for the second session request.

Step 316: The call server CS2 acknowledges reception to the call server CS1 by sending a SIP message 100 TRYING1'.

Step 317: Due to the fact that the media gateway MGW4 is overloaded, the call server CS2 sends, to the call server CS1, a SIP message 503 indicating "service unavailable" for the second session request.

FIGS. 4A, 4B, 5A, 5B, 6A, 6B illustrate the call handling in this exemplary core network CN, but with call servers CS1 and CS2 now enhanced according to the invention, in order to optimize the use of the resources of the incoming and gateways and of the outgoing gateways.

There is an indirect link between the overload of an outgoing media gateway such as MGW4 and the rejection of a session setup by the outgoing call server that manages this outgoing gateway. Furthermore, the behavior of the outgoing call server is not the same for a session to be set up via the incoming gateway MGW1 and for a session to be set up via the incoming gateway MGW2, at a given time, for optimizing the use of the resources of the outgoing gateway MGW4.

Each media gateway, MGW1, . . . , MGW5, informs the call server to which it is connected, about its current total traffic load. In the example illustrated by FIGS. 4, 5, 6:

The incoming media gateway MGW1 informs the incoming call server CS1 to which it is connected, about its current total incoming traffic load i. e. originating from the peripheral network N1.

The incoming media gateway MGW2 informs the incoming call server CS1 to which it is connected, about its current total incoming traffic load i. e. originating from the peripheral network N2.

The outgoing media gateway MGW4 informs the outgoing call server CS2 to which it is connected, about its current total outgoing traffic load i. e. destined for the peripheral network N4.

The current total traffic load of a media gateway is estimated by comparing it with at least one threshold value. Each media gateway informs the call server, to which it is connected, when the traffic load becomes greater or lower than each threshold. In this example, there are two thresholds values THj1 and THj2 for each incoming or outgoing media gateway MGWj. Each threshold value is preferably fixed.

In the example represented on FIGS. 4, 5, 6:

The incoming gateway MGW1 has two threshold values TH11=75% (of maximal admissible load) and TH12=85%. The incoming gateway MGW1 informs the call server CS1 when the incoming traffic load crosses one of the two threshold values TH11 and TH12.

The incoming gateway MGW2 has two threshold values TH21=75% and TH22=85%. The incoming gateway MGW2 informs the call server CS1 when the incoming traffic load crosses one of the two threshold values TH21 and TH22.

The outgoing gateway MGW4 has two threshold values TH41=75% and TH42=85%. The gateway MGW4 informs the call server CS2 when the outgoing traffic load crosses one of the two threshold values TH41 and TH42.

According to the invention, each incoming call server assigns, to the session setup requests carried by an incoming SIP trunk, a priority P(t) that is a function of time t. Hence the call server assigns this priority P(t) to each SIP message containing a session setup request, that it receives via this SIP trunk. It appends, to the session setup request SIP message, an additional header called 'internal priority header' because it is used only inside the core network. This 'internal priority header' contains the value of the internal priority P(t) assigned to the session setup request contained in the message. It is discarded at the boundary when the session setup request SIP message exits the core network. It co-exists with the classical priority header that may have been assigned upstream, for instance for privileging the emergency calls, and which is maintained when crossing any IP network.

The priority P(t) is dynamically assigned by taking into account the characteristics of a SIP trunk, these characteristics being defined by the operator of the core network and depending on the time of the day. For simplifying the examples, we will consider that each incoming and outgoing media gateway is linked to a peripheral network by a single trunk. So there is a single priority value P(t) for each peripheral network N1, . . . , N5.

An operator adjusts the outgoing gateway resources occupied by the data flows that are respectively originating from given incoming gateways and that are destined for a given outgoing gateway, by adjusting the priorities respectively assigned to these data flows, at the entry of the core network. So it can favor at least one incoming peripheral network and disfavor at least one incoming peripheral network, in order to provide requested resources, at the output of a given outgoing gateway, according to service level agreements with customers.

For instance, the traffic load statistics and the service level agreement negotiated with the various networks lead to define the following table. This table is then applied to each SIP trunk attached to each incoming network N1, N2.

|  | Time of the day | | | |
| --- | --- | --- | --- | --- |
|  | H1 | H1' | H2 | H2' |
| $P_{Network1}(t)$ | P2 | P1 | P2 | P3 | P1 |
| $P_{Network2}(t)$ | P1 | P3 | P2 | P1 | P2 |

P1 = Highest priority
P2 = Medium priority
P3 = Lowest priority

The operator favors the incoming network N1 during its peak of incoming traffic at [H1, H1'] by giving it the highest priority P1 while it gives the lowest priority P3 to the incoming network N2.

The operator favors the incoming network N2 during its peak of incoming traffic at [H2, H2'] by giving it the highest priority P1 while it gives the lowest priority P3 to the incoming network N1.

When a session setup request is received by a call server (either incoming or outgoing), it accepts or rejects a session setup, by the following method:

It retrieves the characteristics of the SIP trunk that is carrying this request. In particular it retrieves, in a memory, the internal priority that is currently assigned to this trunk. This internal priority will be translated into an 'internal priority' header attached to each session when the call server is triggered for setting session. The value of the internal priority has been previously given by an operator, on a per SIP trunk basis, preferably as a function of the time of the day, after considering load statistics for the trunk.

Then the call server considers the load of each media gateway (either incoming or outgoing) that it controls, and it reads the internal priority value of each trunk (or media gateway). It accepts or rejects to set up a session according to the internal priority value, when there is an overloaded incoming or outgoing media gateway. Hence depending on the time, a same SIP trunk can be either favored by a high priority whereas, at some time later, it will be disfavored by a medium priority, or a low priority.

In the examples illustrated by FIGS. 4A, 4B, 5A, 5B, 6A, 6B, the behavior of each call server, CS1, CS2, can be summarized as follows, if the associated outgoing media gateway MGWj has been configured with two thresholds THj1 and THj2:

| Internal priority value assigned to a given SIP trunk | Traffic load > THj1 (75%) | Traffic load > THj2 (85%) |
| --- | --- | --- |
| P1 (High) | Session accepted | Session accepted |
| P2 (Medium) | Session accepted | Session rejected |
| P3 (Low) | Session rejected | Session rejected |

For instance, let us consider the peripheral network N1 that supplies its maximal traffic load during the time interval [H1, H1'] everyday, and the peripheral network N2 that supplies its maximal traffic load during the time interval [H2, H2'] every day. During the time interval [H2, H2'], for instance, the priority of the flows arriving via the media gateway MGW1 is P3 (Low), while the internal priority value of the flows arriving via the media gateway MGW2 is P1 (High). If the outgoing media gateway MGW4 is very overloaded, i. e. if the total traffic load in the outgoing media gateway MGW4 is greater than the threshold TH42=85%, the outgoing call server CS2 decides to reject the session setup requests for the flows from the peripheral network N1 because it has a low internal priority value P3. It accepts the session setup requests for the flows from the peripheral network N2 because they have high internal priority value P1.

Conversely, during the time interval [H1, H1'], if the outgoing media gateway MGW4 is very overloaded, i. e. if the total traffic load in the outgoing media gateway MGW4 is greater than the threshold TH42=85%, the outgoing call server CS2 decides to reject the session setup requests for the flows from the peripheral network N2 because they have a low internal priority value P3. It accepts the session setup requests for the flows from the peripheral network N1 because they have a high internal priority value P1.

The incoming call server CS1 behaves similarly when an incoming media gateway MGW1 or MGW2 is much overloaded, except that it has not to read internal priority headers since it retrieves the internal priority values in a memory, because these internal priorities have been assigned to the incoming trunks by this incoming call server CS1.

Figure 4A:
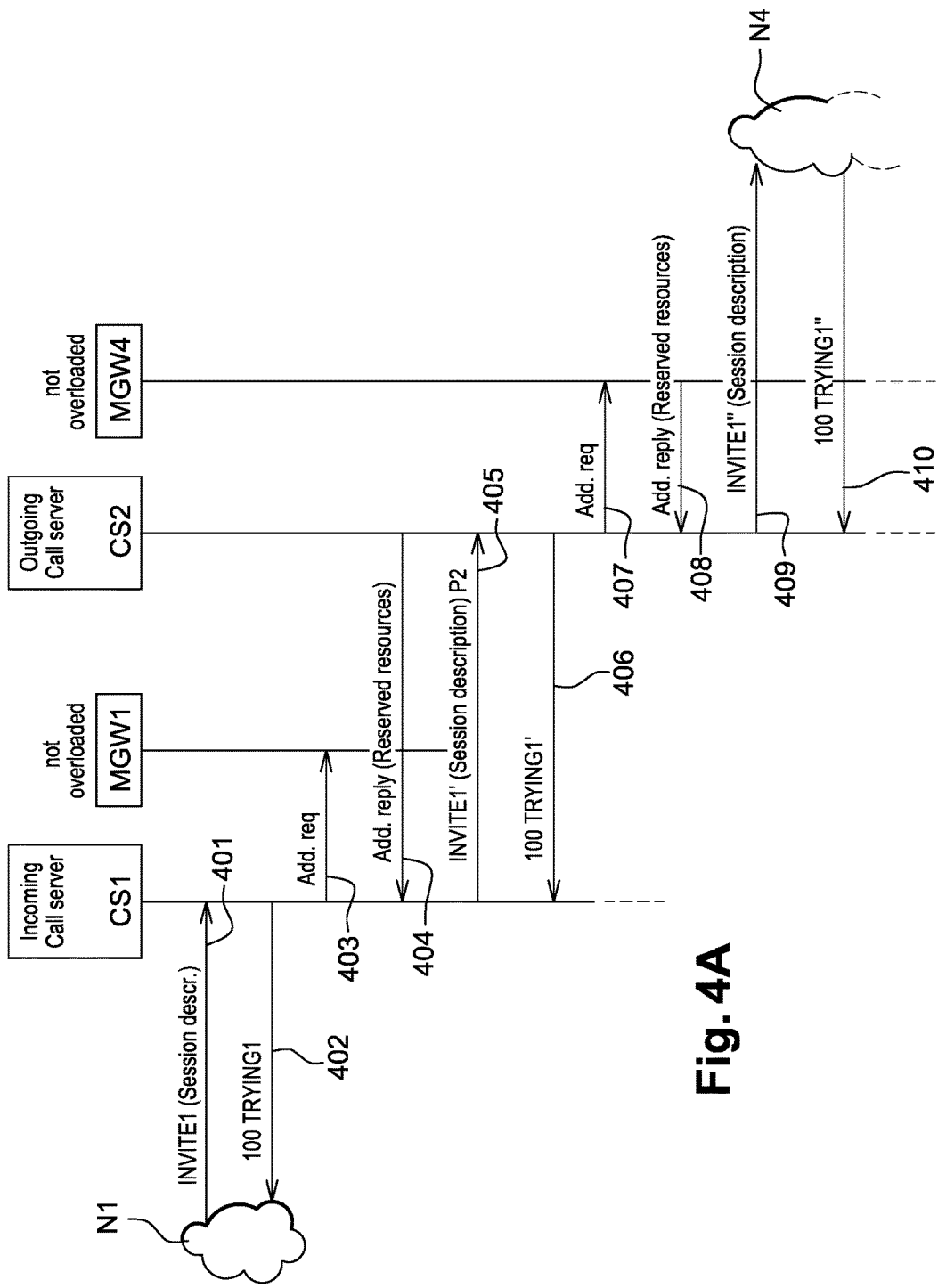
FIG. 4A, 4B, 5A, 5B, 6A, 6B illustrate the session setup in this exemplary core network, but with call servers now enhanced according to the invention, in order to optimize the use of the resources of the incoming gateways and of the outgoing gateways.
Figure 4B:
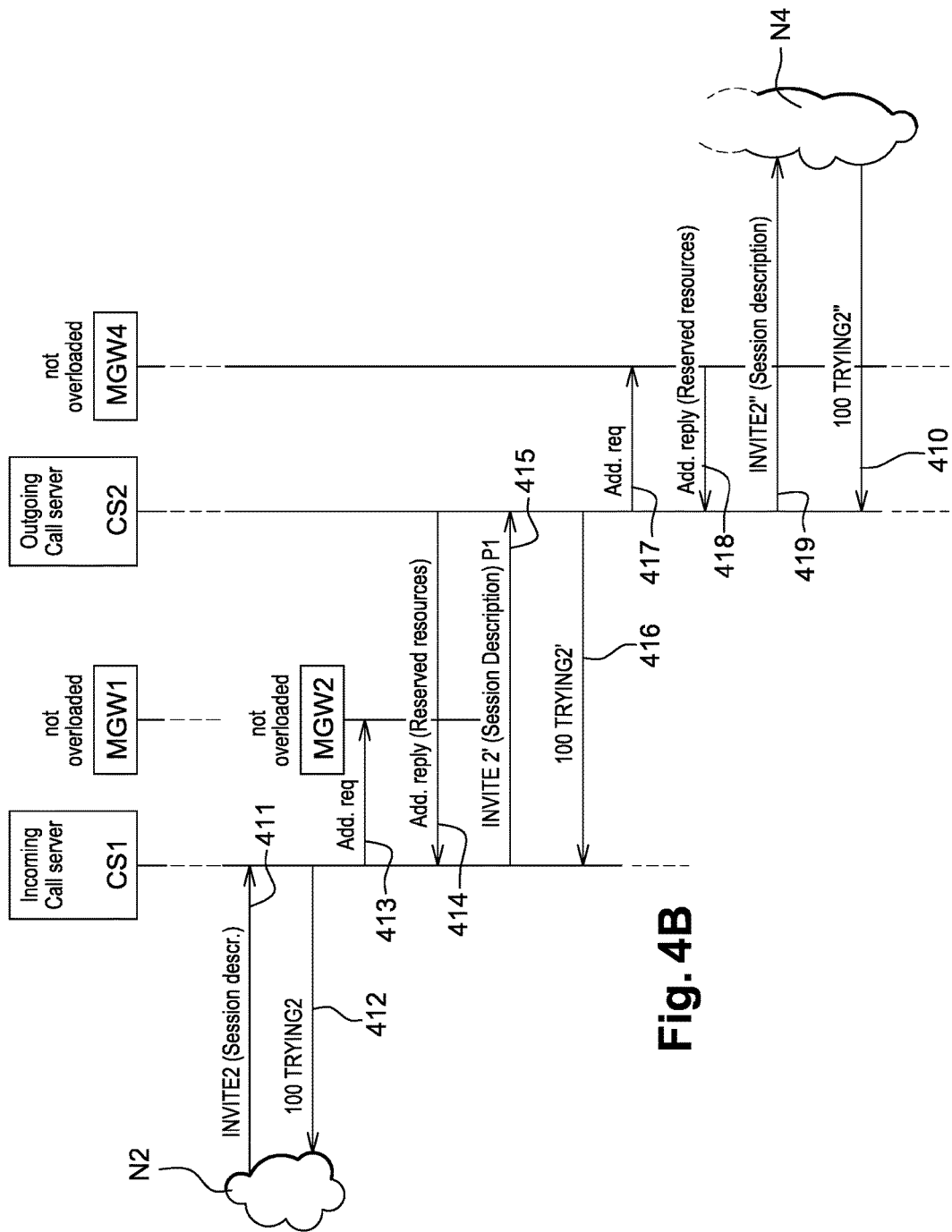

FIGS. 4A and 4B illustrate the simplest case, i. e. where the incoming media gateways MGW1 and MGW2, and the outgoing media gate MGW4 are not overloaded.

The call server CS1 has preliminarily assigned the internal priority value P2 to the trunk linking it to the peripheral network N1, and the internal priority value P1 to the trunk linking it to the peripheral network N1. These priority values have been chosen by the operator, for the current time, and have been memorized in the call server CS1.

Step 401: The incoming call server CS1 receives a SIP message INVITE1 comprising a session description (according to SDP). This message requests the setup of a session, and is originating from the peripheral network N1.

Step 402: The incoming call server CS1 acknowledges reception by sending a SIP message 100 TRYING1 addressed to the network N1.

Step 403: Upon the reception of the INVITE1 message, the call server CS1 retrieves the characteristics (type of signaling, trusted/untrusted network . . . ) and the value P2 of the internal priority of the incoming SIP trunk that carries the signaling for the session to be set up. Then the call server CS1 applies routing and SIP trunk selection, i. e. selects the incoming media gateway MGW1. Depending on the load of the incoming media gateway MGW1 and the SIP trunk priority, the session is setup or not. In the case represented on FIG. 4, the media gateway MGW1 is not overloaded, so the call server CS1 reserves RTP resources (a RTP termination) at the selected media gateway MGW1, by sending an H.248 message "Add.req" to the media gateway MGW1. The internal priority value does not matter in this case.

Step 404: The media gateway MGW1 replies to the call server CS1 by sending a H.248 message "Add.reply" containing a session descriptor (according to SDP) comprising the characteristics of the RTP resources selected in the media gateway MGW1 for the session.

Step 405: Then the call server CS1 forwards the SIP message INVITE1 as a SIP message INVITE1', towards the outgoing call server CS2. This SIP message INVITE1' comprises a session descriptor (according to SDP) and an internal priority header containing the value P2 of the internal priority assigned to the incoming SIP trunk that carries the signaling for the session to be set up.

Step 406: The outgoing call server CS2 acknowledges reception to the incoming call server CS1 by sending a SIP message 100 TRYING1'.

Step 407: Upon the reception of the message INVITE1', the call server CS2 retrieves the characteristics (type of signaling, trusted/untrusted network . . . ) of the incoming SIP trunk that carries the signaling for the session to be set up. As the SIP message INVITE1' carries an internal priority header, the call server CS2 reads the priority value P2. This header takes precedence over the SIP configuration attached to the call server CS2. Therefore the call server CS2 considers the second SIP session setup request with the internal priority P2. The call server CS2 applies routing and outgoing media gateway selection. Depending on the load of the selected media gateway and the SIP trunk internal priority, the session is setup or not. In the case represented on FIG. 4, the selected media gateway is MGW4, and the internal priority value does not matter since the media gateway MGW4 is not overloaded. The outgoing call server CS2 reserves a RTP termination in the selected media gateway MGW4, for the session, by sending an H.248 message "Add.req" to the media gateway MGW4.

Step 408: The media gateway MGW4 responds to the call server CS2 by sending an H.248 message "Add.reply" containing a session descriptor comprising the characteristics of the RTP termination selected for the session.

Step 409: The call server CS2 forwards the message INVITE14", to a remote node in the peripheral network N4, as a SIP message INVITE1" including a session description according to SDP and describing, in particular, the RTP termination selected at the incoming media gateway MGW4, in order to set up the session with the RTP termination reserved at the outgoing media gateway MGW4 for the first session.

Step 410: The remote node, in the peripheral network N4, acknowledges reception, to the call server CS2, by a SIP message 100 TRYING.

Step 411: The incoming call server CS1 receives a SIP message INVITE2 requesting the setup of a second session, and originating from the peripheral network N2. It comprises a session descriptor (according to SDP).

Step 412: The incoming call server CS1 responds with a SIP message 100 TRYING2 addressed to the network N2.

Step 413: Upon the reception of the INVITE2 message, the call server CS1 retrieves the characteristics (type of signaling, trusted/untrusted network . . . ) and the value P1 of the internal priority of the incoming SIP trunk that carries the signaling for the session to be set up. Then the call server CS1 applies routing and SIP trunk selection, i. e. selects the media gateway MGW2. Depending on the load of the media gateway MGW2 and the internal priority, the session is setup or not. In the case represented on FIG. 4 the media gateway MGW2 is not overloaded, so the call server CS1 reserves RTP resources (a RTP termination) at the selected media gateway MGW2, by sending an H.248 message "Add.req" to the media gateway MGW2.

Step 414: The media gateway MGW2 replies to the call server CS1 by sending a Add reply H.248 message The media gateway MGW2 replies to the call server CS1 by sending a H.248 message "Add.reply" containing a session descriptor (according to SDP) comprising the characteristics of the RTP resources selected in the media gateway MGW2 for the session.

Step 415: Then the call server CS1 forwards the SIP INVITE2 message as a SIP message INVITE2', towards the outgoing call server CS2. This SIP message INVITE2' comprises a session description (according to SDP) and the value P1 of the internal priority of the incoming SIP trunk that carries the signaling for the second session to be set up.

Step 416: The call server CS2 acknowledges reception to the call server CS1 by sending a SIP message 100 TRYING2'.

Step 417: Upon the reception of the message INVITE2', the call server CS2 retrieves the characteristics (type of signaling, trusted/untrusted network . . . ) and the value P1 of the internal priority of the incoming SIP trunk that carries the signaling for the session to be set up. It finds the internal priority value P1 in the internal priority header attached to the message INVITE2'. As the SIP message INVITE2' carries an internal priority header, this header takes precedence over the SIP configuration attached to the call server CS2. Therefore the call server CS2 considers the second SIP session with the internal priority P1. The call server CS2 applies routing and outgoing media gateway selection. Depending on the load of the selected media gateway and the internal priority, the session is setup or not. In the case represented on FIG. 4, the selected media gateway is MGW4, and the internal priority value does not matter since the media gateway MGW4 is not overloaded. The outgoing call server CS2 reserves a RTP termination in the selected media gateway MGW4, for the session, by sending an H.248 message "Add.req" to the media gateway MGW4.

Step 418: The media gateway MGW4 responds to the call server CS2 by sending an H.248 message "Add.reply" containing a session descriptor (according to SDP) comprising the characteristics of the RTP termination selected in the media gateway MGW4 for the second session.

Step 419: The call server CS2 forwards the message INVITE2', to a remote node in the peripheral network N4, as a SIP message INVITE2" including a session description (according to SDP) and describing, in particular, the RTP termination selected at the incoming media gateway MGW4, in order to set up the session with the RTP termination reserved at the outgoing media gateway MGW4 for the second session.

Step 420: The remote node, in the peripheral network N4, acknowledges reception, to the call server CS2, by a SIP message 100 TRYING2".

Figure 5A:
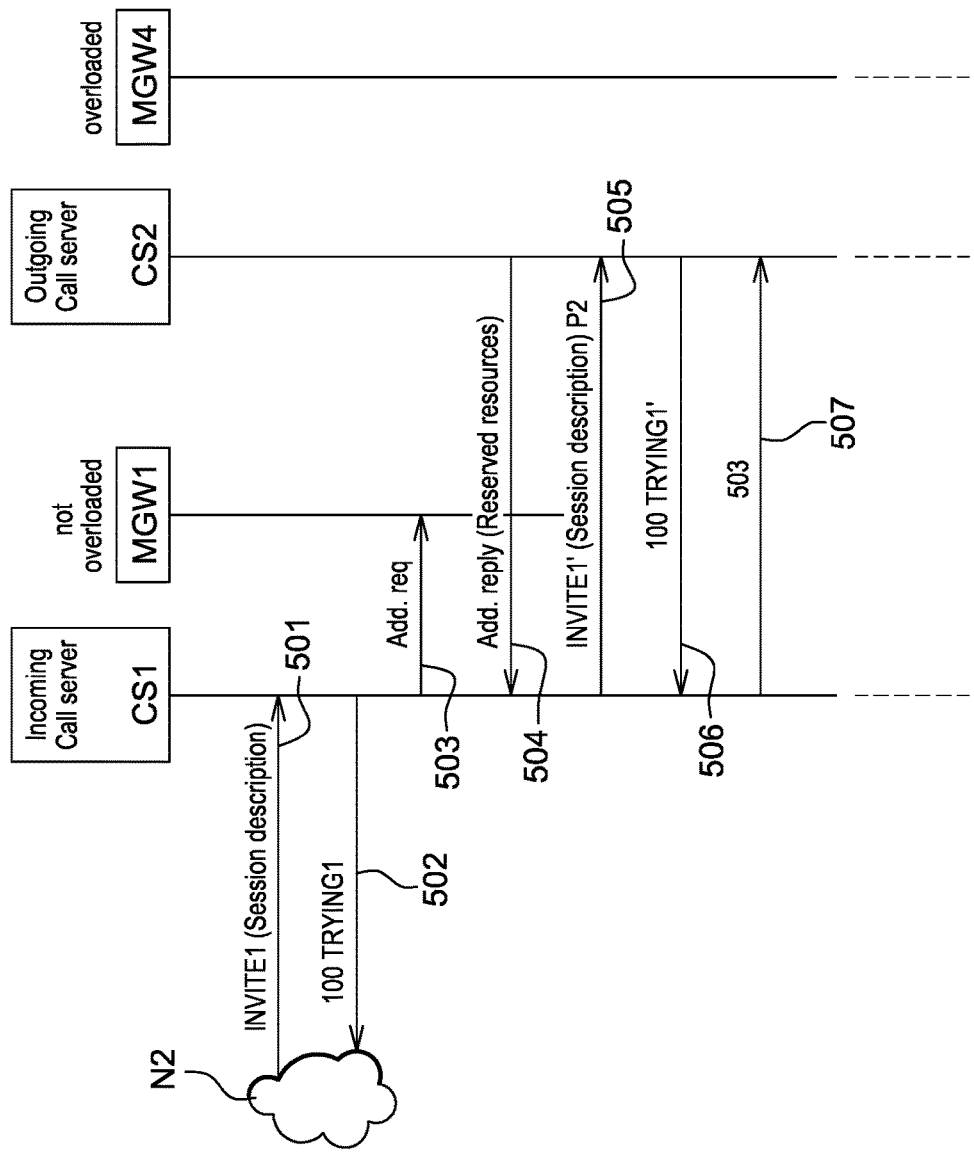
Figure 5B:
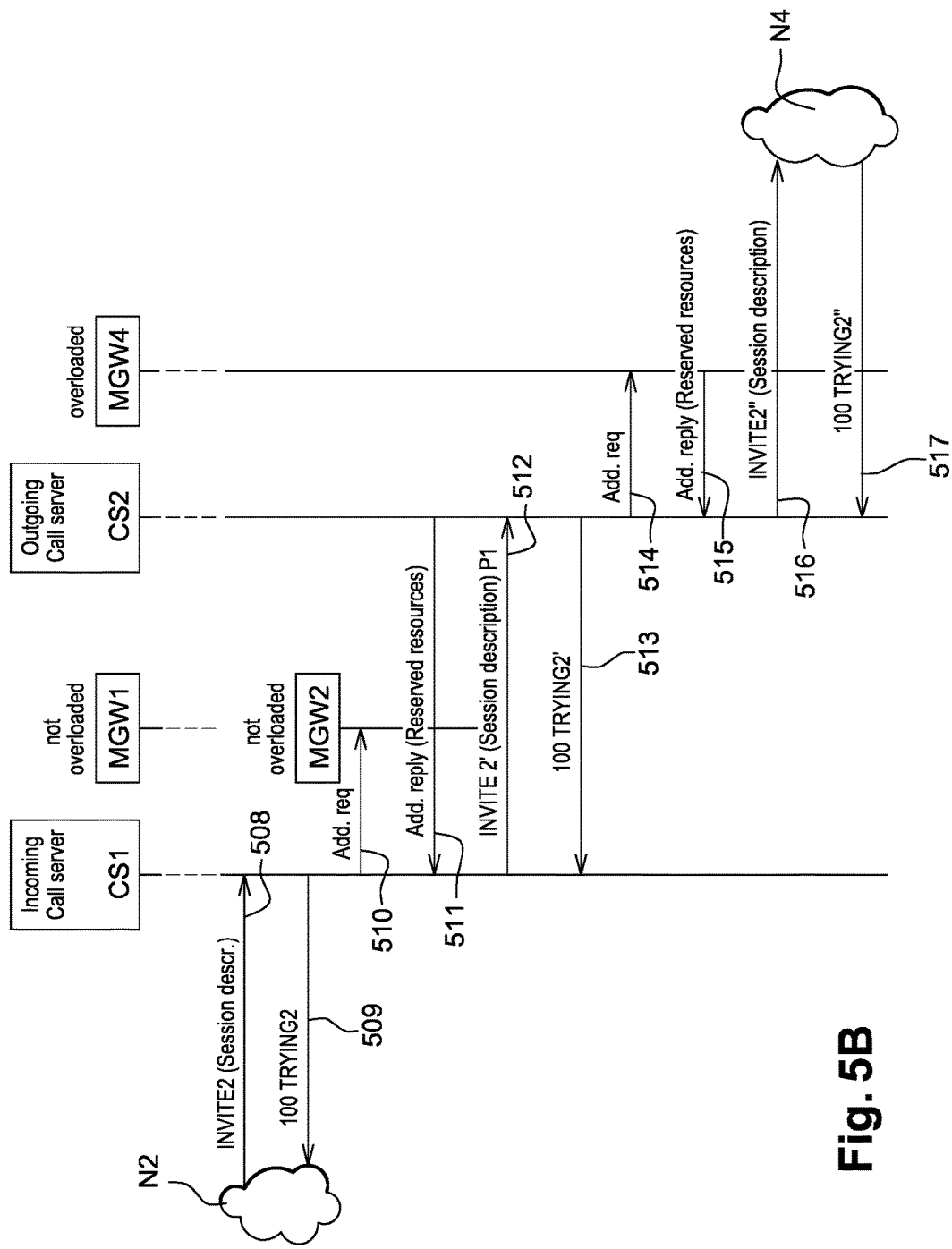

FIGS. 5A and 5B illustrate the case where two incoming media gateways MGW1 and MGW2 are not overloaded, and an outgoing media gateway MGW4 is overloaded.

The call server CS1 has preliminarily assigned the internal priority value P2 to the trunk linking it to the peripheral network N1, and the internal priority value P1 to the trunk linking it to the peripheral network N1. These priority values have been chosen by the operator, for the current time, and have been memorized in the call server CS1.

We consider a call handling just after the media gateway MGW4 has informed the call server CS2 that it is very overloaded (Load >85%). Then the call server CS2 takes into account this information when it decides to accept or to reject a session setup for a new call that should be routed via the media gateway MGW4

Step 501: The incoming call server CS1 receives a SIP message INVITE1, requesting the setup of a session, and originating from the peripheral network N1. It comprises a session descriptor (according to SDP).

Step 502: The incoming call server CS1 responds by sending a SIP message 100 TRYING1 addressed to the network N1.

Step 503: Upon the reception of the INVITE1 message, the call server CS1 retrieves the characteristics (type of signaling, trusted/untrusted network . . . ) and the value P2 of the internal priority of the incoming SIP trunk that carries the signaling for the session to be set up. Then the call server CS1 applies routing and SIP trunk selection, i. e. selects the incoming media gateway MGW1. Depending on the load of the media gateway MGW1 and the SIP trunk priority, the session is setup or not. In the case represented on FIG. 5, the media gateway MGW1 is not overloaded, so the call server CS1 reserves RTP resources (a RTP termination) at the selected media gateway MGW1, by sending an H.248 message "Add.req" to the media gateway MGW1. The internal priority does not matter in this case.

Step 504: The media gateway MGW1 replies to the call server CS1 by sending a H.248 message "Add.reply" containing a session descriptor (according to SDP) comprising the characteristics of the RTP resources selected in the media gateway MGW1 for the session.

Step 505: Then the call server CS1 forwards the SIP message INVITE1 message as a SIP message INVITE1', towards the outgoing call server CS2. This SIP message INVITE1' comprises a session descriptor and an internal priority header containing the value P2 of the internal priority assigned to the incoming SIP trunk that carries the signaling for the session to be set up.

Step 506: First, the call server CS2 acknowledges reception to the call server CS1 by sending a SIP message 100 TRYING1'.

Step 507: Then, the call server CS2 responds to the call server CS1 by sending a SIP message 503 rejecting the session setup request, because the media gateway MGW4 is too overloaded for accepting a session having a medium priority value P2.

Step 508: The incoming call server CS1 receives a SIP message INVITE2, requesting the setup of a second session, originating from the peripheral network N2. It comprises a session descriptor (according to SDP).

Step 509: The incoming call server CS1 acknowledges reception with a SIP message 100 TRYING2 addressed to the network N2.

Step 510: Upon the reception of the INVITE2 message, the call server CS1 retrieves the characteristics (type of signaling, trusted/untrusted network . . . ) and the internal priority value P1 of the incoming SIP trunk that carries the signaling for the session to be set up. The call server CS1 applies routing and selection of an incoming media gateway. Depending on the load of the selected gateway MGW2 and the internal priority, the call is setup or not. In the case represented on FIG. 5, the selected media gateway MGW2 is not overloaded, so the internal priority does not matter. Hence the call server CS1 requests resources to the media gateway MGW2 by sending an H.248 message "Add.req".

Step 511: The media gateway MGW2 replies to the call server CS1 by sending a H.248 message "Add.reply" containing a session descriptor (according to SDP) comprising the characteristics of the RTP resources selected in the media gateway MGW2 for the second session.

Step 512: Then the call server CS1 forwards the SIP message INVITE2 message as a SIP message INVITE2', towards the outgoing call server CS2. This SIP message INVITE2' comprises a session descriptor and an internal priority header containing the value P1 of the internal priority assigned to the incoming SIP trunk that carries the signaling for the session to be set up.

Step 513: First the outgoing call server CS2 acknowledges reception to the call server CS1 by sending a SIP message 100 TRYING2'.

Step 514: Then the outgoing call server CS2 retrieves the characteristics (type of signaling, trusted/untrusted network . . . ) and the value P1 of the internal priority of the incoming SIP trunk that carries the signaling for the session to be set up. This value P1 is carried by an internal priority header attached to the session setup request INVITE 2'. The internal priority carried by this header takes precedence over the SIP configuration attached to the call server CS2. It applies routing and selection of a media gateway. Depending on the load of the selected media gateway MGW4 and the SIP trunk internal priority, the session is setup or not. In the present case, the internal priority has the value P1 (High). As the media gateway MGW4 is overloaded, the call server CS2 takes into account the value P1 (High) of the internal priority: So it accepts the session setup request, by sending a H.248 message "Add.req" to the media gateway MGW4, in order to reserve resources for this second session.

Step 515: The media gateway MGW4 replies to the call server CS2 by sending a H.248 message "Add.reply" containing a session descriptor (according to SDP) comprising the characteristics of the RTP resources selected in the media gateway MGW4 for the second session.

Step 516: The call server CS2 forwards the message INVITE2', to a remote node in the peripheral network N4, as a SIP message INVITE2" including a session description (according to SDP) and describing, in particular, the RTP termination selected at the incoming media gateway MGW4, in order to set up the session with the RTP termination reserved at the outgoing media gateway MGW4 for the second session Step 517: The peripheral network N4 acknowledges reception to the call server CS2 by sending a SIP message 100 TRYING2".

Figure 6A:
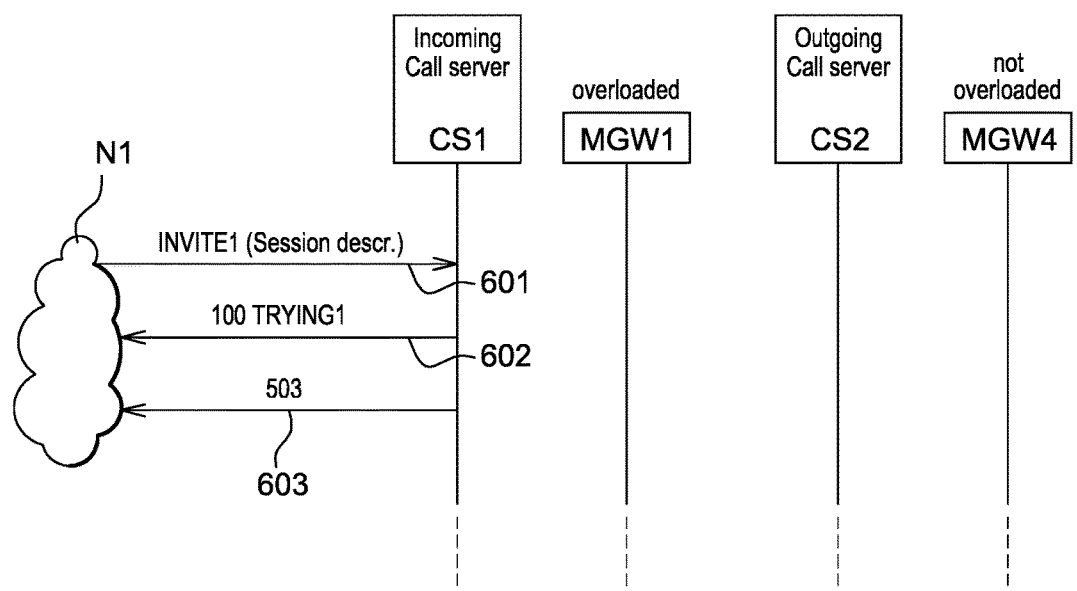
Figure 6B:
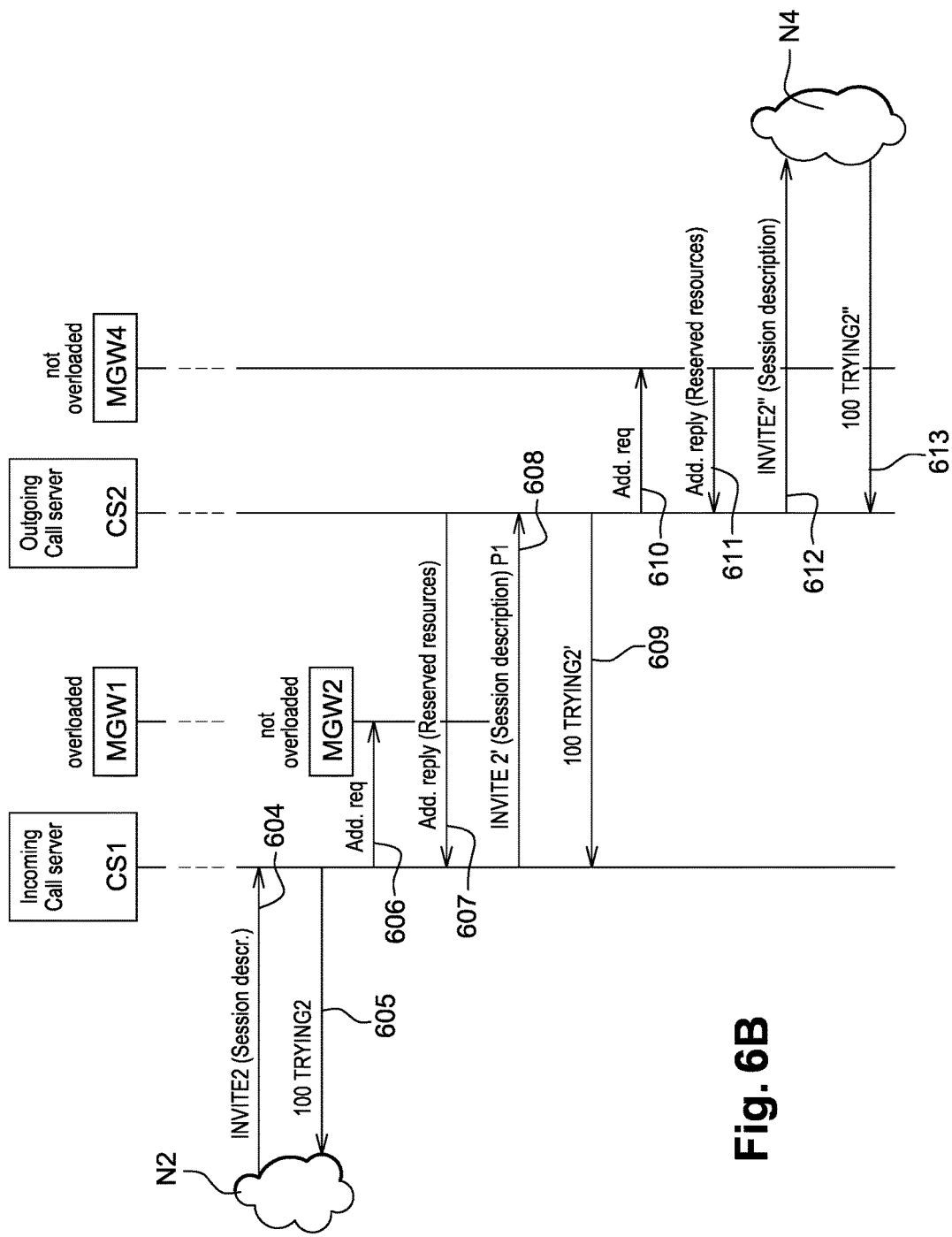

FIGS. 6A and 6B illustrate the case where the incoming media gateways MGW1 is overloaded, the incoming media gateway MGW2 is not overloaded, and the outgoing media gate MGW4 is not overloaded.

The call server CS1 has preliminarily assigned the internal priority value P2 to the trunk linking it to the peripheral network N1, and the internal priority value P1 to the trunk linking it to the peripheral network N1. These priority values have been chosen by the operator, for the current time, and have been memorized in the call server CS1.

Step 601: The incoming call server CS1 receives a SIP message INVITE1 requesting the setup of a first session, and originating from the peripheral network N1. It comprises a session descriptor (according to SDP).

Step 602: First the incoming call server CS1 acknowledges reception by sending a SIP message 100 TRYING1 to the network N1.

Step 603: The incoming call server CS1 retrieves the characteristics of the incoming SIP trunk carrying the session setup request, and the internal priority attached to this SIP trunk (The value of which is P2 in this example). Then the call server CS1 applies routing and SIP trunk selection, i. e. selects the incoming media gateway MGW1. Depending on the load of the media gateway MGW1 and the SIP trunk priority, the session is setup or not. In the case represented on FIG. 6, the media gateway MGW1 is overloaded. As the incoming media gateway MGW1 is overloaded, and as the internal priority is only P2 (medium), the incoming call server CS1 rejects the session setup request by sending a SIP message "503".

Step 604: The incoming call server CS1 receives a SIP message INVITE2, requesting the setup of a second session, and originating from the peripheral network N2. It comprises a session descriptor (according to SDP).

Step 605: The incoming call server CS1 acknowledges reception with a SIP message 100 TRYING2 addressed to the network N2.

Step 606: Upon the reception of the INVITE1 message, the call server CS1 retrieves the characteristics (type of signaling, trusted/untrusted network . . . ) and the internal priority value P1 of the incoming SIP trunk that carries the signaling for the session to be set up. The call server CS1 applies routing and outgoing media gateway selection. Depending on the load of the selected media gateway MGW2 and the internal priority, the session is setup or not. In the case represented on FIG. 6, the media gateway MGW2 is not overloaded, so the value of the internal priority does not matter. Hence the call server CS1 requests resources to the media gateway MGW2 by sending an H.248 message "Add.req".

Step 607: The media gateway MGW2 replies to the call server CS1 by sending an Add.reply H.248 message.

Step 608: Then the call server CS1 forwards the SIP message INVITE2 message as a SIP message INVITE2', towards the outgoing call server CS2. This SIP message INVITE2' comprises a session descriptor and an internal priority header containing the value P1 of the internal priority assigned to the incoming SIP trunk that carries the signaling for the session to be set up.

Step 609: First the outgoing call server CS2 acknowledges reception to the call server CS1 by sending a SIP message 100 TRYING2'.

Step 610: Upon the reception of the message INVITE2, the call server CS2 retrieves the characteristics (type of signaling, trusted/untrusted network . . . ) and the value P1 of the internal priority of the incoming SIP trunk. As the SIP message INVITE2 carries an internal priority header, this header takes precedence over the SIP configuration attached to the call server CS2 and therefore the call server CS2 considers the internal priority of the SIP trunk. Then the CS2 applies routing and selects an outgoing media gateway. Depending on the load of the selected media gateway MGW4 and the internal priority, the session is setup or not. In the case represented on FIG. 6, the selected media gateway MGW4 is not overloaded, so the internal priority value does not matter. The outgoing call server CS2 reserves a RTP termination in the selected media gateway MGW4, for the second session, by sending an H.248 message "Add.req" to the media gateway MGW4.

Step 611: The media gateway MGW4 replies to the call server CS2 by sending a H.248 message "Add.reply" containing a session descriptor (according to SDP) comprising the characteristics of the RTP resources selected in the media gateway MGW4 for the second session.

Step 612: The call server CS2 forwards the message INVITE2', to a remote node in the peripheral network N4, as a SIP message INVITE2" including a session description (according to SDP) describing, in particular, the RTP termination selected at the incoming media gateway MGW4, in order to set up the session with the RTP termination reserved at the outgoing media gateway MGW4 for the second session.

Step 613: The peripheral network N4 acknowledges reception to the call server CS2 by sending a SIP message 100 TRYING2".

The previous examples have been described in a core network that uses the signalling protocol SIP, but the invention can be applied to core networks using other signalling protocols. For instance, in a core network using the signalling protocol called "integrated services digital network user part" (ISUP), the internal priority can be carried by a specific parameter in an ISUP message, instead of being carried in an internal priority header of a SIP message. The use of the internal priority by the call servers is similar.

The invention claimed is:

1. An incoming call server for a core network comprising a media gateway, controlled by the call server, the incoming call server being configured to:
   receive a session setup request message;
   retrieve an internal priority value;
   assign the internal priority value to an incoming SIP trunk linked to the core network, the incoming SIP trunk carrying the session setup request message; and
   attach an internal priority header to the session setup request message received by the incoming call server, the internal priority header containing the internal priority value assigned to the incoming SIP trunk carrying the session setup request message, the internal priority header different from a priority header assigned to the session setup request message prior to entry of the core network, the internal priority header being used only inside the core network and discarded when the session setup request message exits the core network.

2. The incoming call server according to claim 1, wherein the incoming call server is further configured to:
   the internal priority value in a memory; and
   retrieve the internal priority value assigned to the incoming SIP trunk by reading the internal priority value in the memory.

3. The incoming call server according to claim 1, wherein the incoming call server is further configured to:
   decide to accept or to reject the session setup request as a function of the internal priority value.

4. An outgoing call server, the outgoing call server configured to:
- receive a SIP message INVITE request from an incoming call server of a core network, the SIP message INVITE request having attached an internal priority header containing an internal priority value assigned, by the incoming call server, to an incoming SIP trunk linked to the core network, the incoming SIP trunk carrying the SIP message INVITE request;
- read the internal priority header attached to the SIP message INVITE request received from the incoming call server, the internal priority header to be used only inside the core network and discarded when the SIP message INVITE request exits the core network, and
- decide to accept or to reject the SIP message INVITE request as a function of the internal priority value.

5. An outgoing call server, the outgoing call server configured to:
- receive a session setup request message from another call server of a core network;
- retrieve an internal priority value assigned to an incoming SIP trunk carrying the session setup request message received by the outgoing call server, by reading an internal priority header attached to the session setup request message, the internal priority header containing an internal priority value assigned upstream of the outgoing call server, the internal priority header assigned and used only inside the core network and discarded when the setup request message exits the core network; and
- decide to accept or to reject the session setup request message as a function of the internal priority value.

* * * * *